US011290016B2

(12) United States Patent
Paatero et al.

(10) Patent No.: US 11,290,016 B2
(45) Date of Patent: Mar. 29, 2022

(54) CONVERTER ASSEMBLY

(71) Applicant: ABB Schweiz AG, Baden (CH)

(72) Inventors: Esa-Kai Paatero, Vantaa (FI); Nicola Notari, Baden (CH)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 17/066,643

(22) Filed: Oct. 9, 2020

(65) Prior Publication Data

US 2021/0111628 A1 Apr. 15, 2021

(30) Foreign Application Priority Data

Oct. 9, 2019 (EP) ..................................... 19202125

(51) Int. Cl.
| | |
|---|---|
| *H02M 3/24* | (2006.01) |
| *H02M 3/158* | (2006.01) |
| *G05F 1/56* | (2006.01) |
| *H02J 9/06* | (2006.01) |
| *H02M 1/12* | (2006.01) |
| *H02M 7/219* | (2006.01) |
| *H02M 1/00* | (2006.01) |

(52) U.S. Cl.
CPC ............ *H02M 3/1584* (2013.01); *G05F 1/56* (2013.01); *H02J 9/061* (2013.01); *H02M 1/126* (2013.01); *H02M 7/219* (2013.01); *H02M 1/0003* (2021.05)

(58) Field of Classification Search
CPC ...... H02M 1/36; H02M 1/0003; H02M 1/007; H02M 1/4225; H02M 3/158; H02M 5/4585; H02M 1/126; H02M 7/125; H02M 3/1584; H02M 7/219; H02J 2207/50; H02J 9/061; H02J 9/062; H02J 3/007
See application file for complete search history.

(56) References Cited

U.S. PATENT DOCUMENTS

| 9,796,258 B1 * | 10/2017 | Bundschuh | ........... H02M 5/225 |
|---|---|---|---|
| 2005/0213357 A1 * | 9/2005 | Paatero | .................. H02M 5/458 363/95 |

(Continued)

OTHER PUBLICATIONS

European Patent Office, Extended Search Report issued in corresponding Application No. 19202125.1, dated Mar. 30, 2020, 9 pp.

*Primary Examiner* — Jared Fureman
*Assistant Examiner* — Esayas G Yeshaw
(74) *Attorney, Agent, or Firm* — Leydig, Voit & Mayer, Ltd.

(57) ABSTRACT

A converter assembly including a source connection system comprising a primary source connection, and at least one secondary source connection; a load connection system; a primary source converter including a primary rectifier connected electrically to the primary source connection, and having a boost topology, and a DC link connected electrically between the primary rectifier and the load connection system, the DC link including DC link capacitance; a secondary source converter, which is a direct-current converter having a boost topology, connected electrically between the at least one secondary source connection and the DC link; and a pre-charge converter adapted for pre-charging the DC link capacitance. The pre-charge converter includes a pre-charge direct-current converter having a step down topology.

20 Claims, 3 Drawing Sheets

(56) References Cited

U.S. PATENT DOCUMENTS

| | | | |
|---|---|---|---|
| 2010/0308582 A1* | 12/2010 | Rozman | H02P 25/024 |
| | | | 290/31 |
| 2014/0210428 A1* | 7/2014 | Mauder | G05F 1/70 |
| | | | 323/210 |
| 2017/0085124 A1 | 3/2017 | Ho et al. | |
| 2017/0244277 A1 | 8/2017 | Blair et al. | |
| 2020/0006970 A1* | 1/2020 | Chen | H02J 1/001 |
| 2020/0403493 A1* | 12/2020 | Ljushev | H02M 5/4505 |

\* cited by examiner

CONVERTER ASSEMBLY

FIELD OF THE INVENTION

The invention relates to a converter assembly, and more particularly to a converter assembly provided with a DC link.

A DC link, or a direct current link, is a stored energy component comprising capacitance. Before normal operation of a converter assembly, capacitance of the DC link is in a discharged state.

In a typical converter assembly, connecting a discharged capacitance of a DC link directly to a primary current supply such as power supply mains through a primary rectifier of the converter assembly will result in a potentially destructive charging current from the primary current supply to the capacitance of the DC link. It is known in the art to provide a converter assembly with a pre-charge device adapted to limit an electric current when charging DC link capacitance having a low charge.

A known pre-charge device is disclosed in publication US20170244277.

One of the problems associated with known converter assemblies is that pre-charge devices thereof do not allow detailed control of the pre-charging event.

BRIEF DESCRIPTION OF THE INVENTION

An object of the present invention is to provide a converter assembly so as to solve the above problem. The objects of the invention are achieved by a converter assembly which is characterized by what is stated in the independent claim. The preferred embodiments of the invention are disclosed in the dependent claims.

The invention is based on the idea of providing a converter assembly with a pre-charge direct-current converter having a step down topology, and adapted for pre-charging the DC link capacitance.

An advantage of the converter assembly according to the invention is that it allows detailed control of the pre-charging event, thereby enabling a slow pre-charging to a desired voltage.

In an embodiment, a pre-charge converter of the converter assembly is adapted to be supplied selectively from a primary current supply or a secondary current supply. In a further embodiment, a pre-charge converter of the converter assembly is adapted to be supplied from a load of the converter assembly.

In a still further embodiment, the converter assembly is part of an uninterruptible power supply system. Many uninterruptible power supply systems comprise a step down direct-current converter. Consequently, such a known uninterruptible power supply system comprises almost all hardware required for a converter assembly according to the invention.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
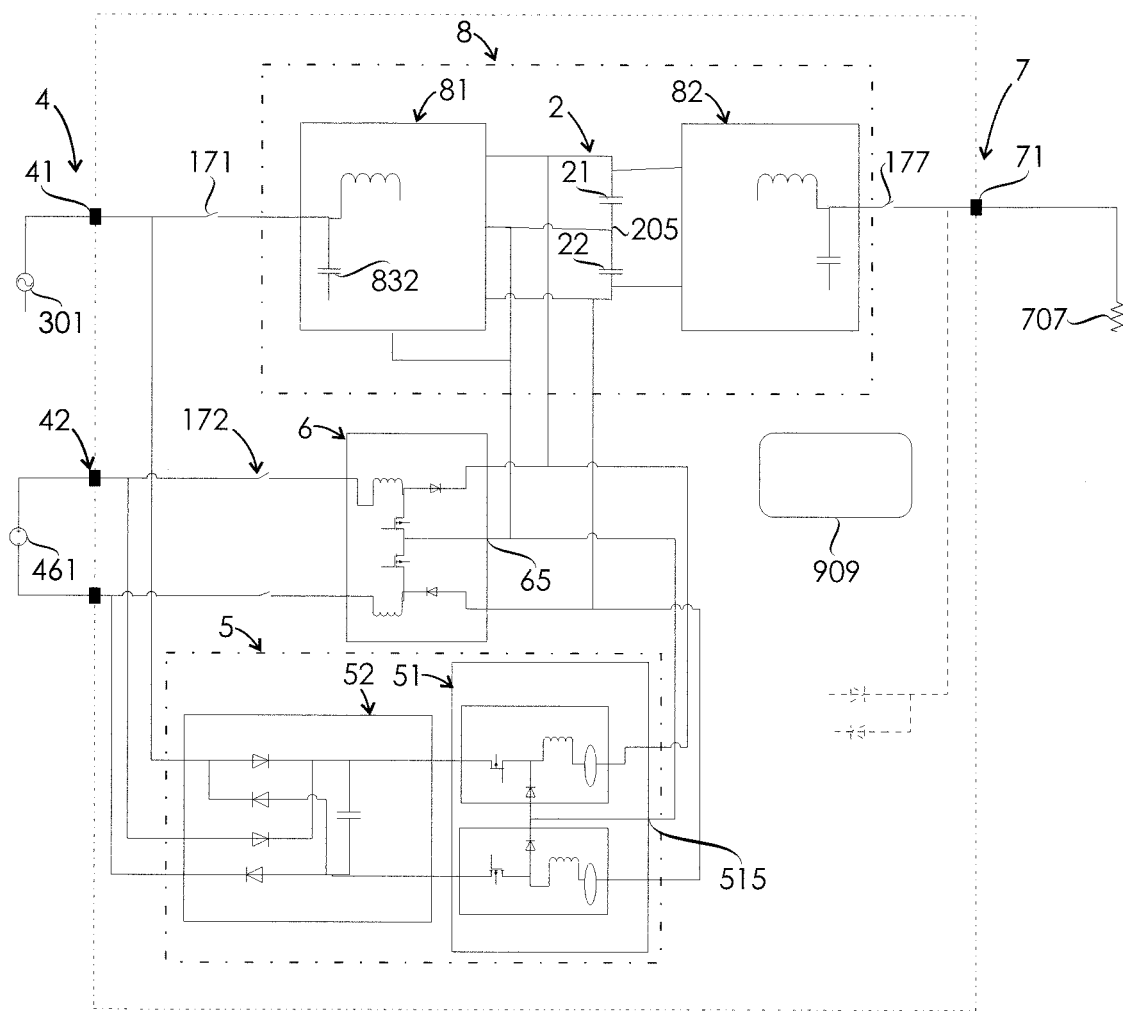
FIG. 1 shows a simplified circuit diagram of a converter assembly according to an embodiment of the invention.

FIG. 1 shows a simplified circuit diagram of a converter assembly comprising a source connection system 4, a load connection system 7, a primary source converter 8, a secondary source converter 6, a pre-charge converter 5, and a control system 909.

The source connection system 4 comprises a primary source connection 41 adapted to be connected electrically to a primary current supply 301, and a secondary source connection 42 adapted to be connected electrically to a secondary current supply 461. The secondary source connection 42 is a direct current connection. In an alternative embodiment, the source connection system comprises a plurality of secondary source connections each adapted to be connected electrically to a corresponding secondary current supply. Herein, two components are defined to be connected electrically to each other when there is a connection between the components enabling transfer of electric energy between the components.

The load connection system 7 comprises a load connection 71 adapted to be connected electrically to a load 707. The load 707 is a single-phase alternating-current load. In an alternative embodiment, the load is a multi-phase alternating-current load.

The primary source converter 8 comprises a primary rectifier 81, a DC link 2, and a primary inverter 82. The primary rectifier 81 has a boost topology, and is connected electrically between the primary source connection 41 and the DC link 2 such that the primary source connection 41 is connected electrically to source side of the primary rectifier 81, and the DC link 2 is connected electrically to load side of the primary rectifier 81. A converter having a boost topology can be called a boost converter or a step-up converter.

The primary source converter 8 is a bidirectional converter adapted to transfer energy both from the primary source connection 41 to the load connection 71, and from the load connection 71 to the primary source connection 41.

Herein, source side and load side of a device are electrical connections of the device such that the source side is adapted for supplying electric energy into the device, and the load side is adapted for supplying electric energy out of the device. When a device is a unidirectional device, source side of the device is an input of the device, and load side of the device is an output of the device.

The primary inverter 82 is connected electrically between the DC link 2 and the load connection 71. In an alternative embodiment, the load of the converter assembly is a direct current load, and the primary inverter is omitted. In a further alternative embodiment, the load of the converter assembly is a direct current load, and the primary inverter is replaced by a DC/DC converter.

The DC link 2 is connected electrically between the primary rectifier 81 and the load connection system 7 such that the DC link 2 is connected to the load connection system 7 through the primary inverter 82. The DC link 2 comprises DC link capacitance including a first capacitance 21 and a second capacitance 22.

The secondary source converter 6 is a direct-current converter having a boost topology. The secondary source converter 6 is connected electrically between the secondary source connection 42 and the DC link 2. The secondary source converter 6 is a bidirectional converter adapted to transfer energy both from the secondary source connection 42 to the DC link 2, and from the DC link 2 to the secondary source connection 42.

The secondary source converter 6 comprises two semiconductor switches adapted to be controlled by the control system 909.

The pre-charge converter 5 is adapted for pre-charging the DC link capacitance. The pre-charge converter 5 comprises a pre-charge direct-current converter 51 having a step down topology, and a rectification and summing circuit 52.

On the source side, the rectification and summing circuit 52 is connected electrically to the secondary source connection 42 and the primary source connection 41 such that an alternating current source side connection of the rectification and summing circuit 52 is connected electrically to the primary source connection 41, and a direct current source side connection of the rectification and summing circuit 52 is connected electrically to the secondary source connection 42. The rectification and summing circuit 52 is adapted to supply energy from the secondary source connection 42 and the primary source connection 41 to the pre-charge direct-current converter 51.

The pre-charge direct-current converter 51 comprises two semiconductor switches adapted to be controlled by the control system 909.

Herein, a converter having a step down topology is a converter adapted to step down voltage supplied to the converter through its source side, and to feed the stepped down voltage out of the converter through its load side. Such a converter can be called a step-down converter or a buck converter.

The DC link 2 is a split DC link with a midpoint reference 205, wherein the DC link 2 comprises a first capacitance 21 and a second capacitance 22 connected in series, and the midpoint reference 205 is connected electrically between the first capacitance 21 and the second capacitance 22. The pre-charge direct-current converter 51 has a midpoint 515 connected electrically to the midpoint reference 205 of the DC link 2. The secondary source converter 6 has a midpoint 65 connected electrically to the midpoint reference 205 of the DC link 2. The midpoint 65 is located electrically between the two semiconductor switches of the secondary source converter 6. In an operating state, the control system 909 is adapted to pre-charge the first capacitance 21 and the second capacitance 22 independently from each other through the secondary source converter 6.

Figure 2:
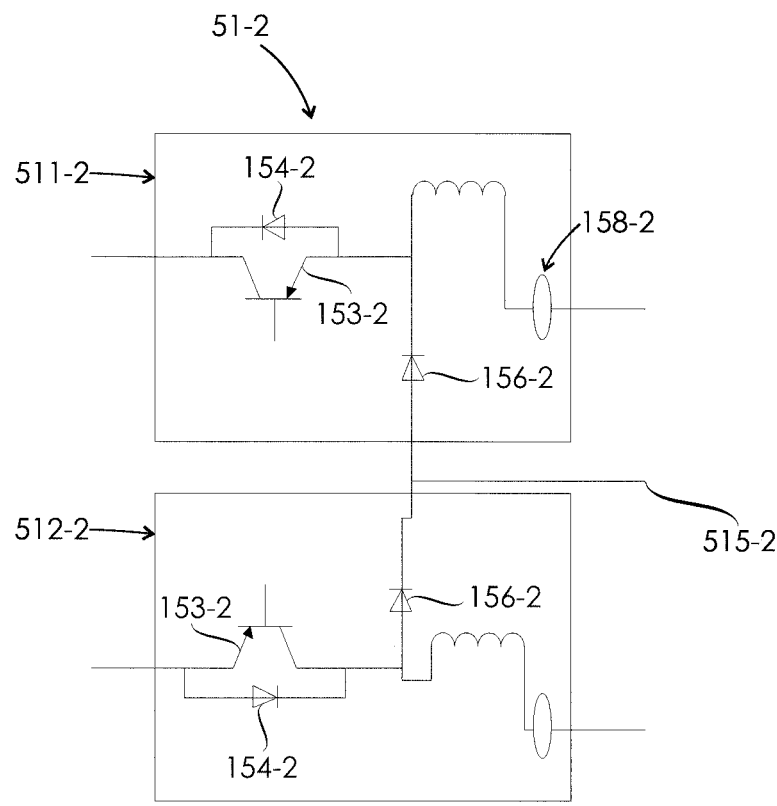
FIG. 2 shows a simplified circuit diagram of a pre-charge direct-current converter of an alternative embodiment.

FIG. 2 shows a simplified circuit diagram of a pre-charge direct-current converter 51-2 of an alternative embodiment. The pre-charge direct-current converter 51-2 comprises two sub units 511-2 and 512-2, each comprising a controllable semiconductor switch 153-2, a first diode 154-2 connected antiparallel with the controllable semiconductor switch 153-2, and a second diode 156-2. The controllable semiconductor switches 153-2 are adapted to be controlled by the control system.

The pre-charge direct-current converter 51-2 has a midpoint 515-2 adapted to be connected electrically to the midpoint reference of the DC link. The midpoint 515-2 is connected electrically between the series connected second diodes 156-2 of the sub units 511-2 and 512-2.

Further, the pre-charge direct-current converter 51-2 has a current sensor 158-2 adapted to sense current passing through a load side connection of the pre-charge direct-current converter 51-2, and adapted to be communicative connected to the control system.

It is possible to replace the pre-charge direct-current converter 51 of FIG. 1 with the pre-charge direct-current converter 51-2 of FIG. 2.

Figure 3:
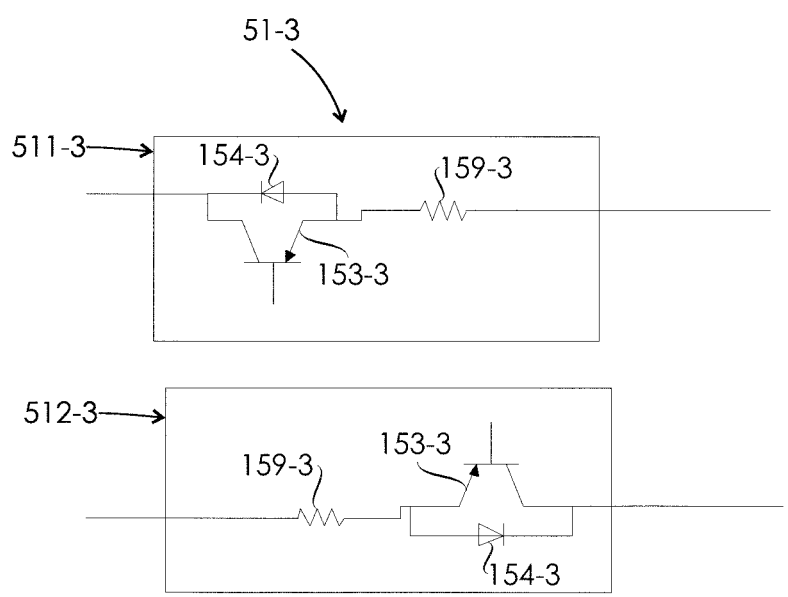
FIG. 3 shows a simplified circuit diagram of a pre-charge direct-current converter of a further alternative embodiment.

FIG. 3 shows a simplified circuit diagram of a pre-charge direct-current converter 51-3 of a further alternative embodiment. The pre-charge direct-current converter 51-3 comprises two sub units 511-3 and 512-3, each comprising a controllable semiconductor switch 153-3, s first diode 154-3 connected antiparallel with the controllable semiconductor switch 153-3, and a resistor 159-3. The controllable semiconductor switches 153-3 are adapted to be controlled by the control system. Unlike the pre-charge direct-current converters 51 and 51-2, the pre-charge direct-current converter 51-3 does not have a midpoint adapted to be connected electrically to the midpoint reference of the DC link.

In an alternative embodiment a summing circuit is omitted from the pre-charge converter, and the pre-charge converter only comprises a rectification circuit connected electrically between the pre-charge direct-current converter and at least one alternating current connection. The at least one alternating current connection may comprise the primary source connection and/or the load connection.

In embodiments where the load connection of the converter assembly is connected electrically to source side of the pre-charge converter, it is possible to pre-charge the DC link capacitance from the load of the converter assembly. In an embodiment, the load connection of the converter assembly is connected electrically to source side of the pre-charge converter through a disconnect device adapted to be controlled by the control system of the converter assembly.

In a further alternative embodiment, source side of the pre-charge converter is only connected electrically to at least one direct current source connection. In said embodiment, the pre-charge converter does not comprise a rectification circuit, and source side of the pre-charge converter is not connected to any alternating current connection.

The control system 909 is adapted to control the primary source converter 8, the secondary source converter 6, and the pre-charge converter 5. The control system 909 is adapted to control the pre-charge converter 5 for pre-charging the DC link capacitance. The control system 909 is also adapted to control secondary source converter 6 for pre-charging the DC link capacitance such that in the beginning of pre-charging event the DC link capacitance is charged through the pre-charge converter 5, and after a voltage of the DC link capacitance has reached a predetermined level, the DC link capacitance is charged through the secondary source converter 6. This kind of two-stage pre-charging event enables both efficient limiting of the pre-charging current throughout the pre-charging event, and a high final voltage for the DC link capacitance.

The converter assembly of FIG. 1 comprises a primary source disconnect device 171, a secondary source disconnect device 172, and a load disconnect device 177. The primary source disconnect device 171, the secondary source disconnect device 172, and the load disconnect device 177 are adapted to be controlled by the control system 909.

The primary source disconnect device 171 is adapted to disconnect the primary rectifier 81 from the primary source connection 41. The primary source disconnect device 171 is connected electrically between the primary source connection 41 and source side of the primary rectifier 81. The alternating current source side connection of the rectification and summing circuit 52 is connected electrically to a point between the primary source connection 41 and the primary source disconnect device 171.

The secondary source disconnect device 172 is adapted to disconnect the secondary source converter 6 from the secondary source connection 42. The secondary source disconnect device 172 is connected electrically between the secondary source connection 42 and source side of the secondary source converter 6. The direct current source side connection of the rectification and summing circuit 52 is connected electrically to a point between the secondary source connection 42 and the secondary source disconnect device 172.

The load disconnect device 177 is adapted to disconnect the load connection 71 from the primary source converter 8. The load disconnect device 177 is connected electrically between the load connection 71 and load side of the primary inverter 82.

The control system 909 is adapted to provide a pre-charging process comprising keeping the primary source disconnect device 171, the secondary source disconnect device 172, and the load disconnect device 177 open while pre-charging the DC link capacitance from the primary current supply 301 and/or the secondary current supply 461, depending which is available. Herein, a switch device such as a disconnect device is open when it is in a non-conducting state, and closed when it is in a conducting state.

The control system 909 is also adapted to provide an equalization process such that, after the DC link capacitance has been pre-charged to a voltage over peak voltage of the primary current supply 301, the primary rectifier 81 is operated in reverse to equalize a voltage over the primary source disconnect device 171 before closing it. In an alternative embodiment, the control system is also adapted to operate the secondary source converter in reverse to equalize a voltage over the secondary source disconnect device before closing it. In a further alternative embodiment, the control system is also adapted to operate the primary inverter to equalize a voltage over the load disconnect device before closing it.

The primary current supply 301 is a single-phase alternating-current source. In an alternative embodiment, the primary current supply is a multi-phase alternating-current source.

Figure 4:
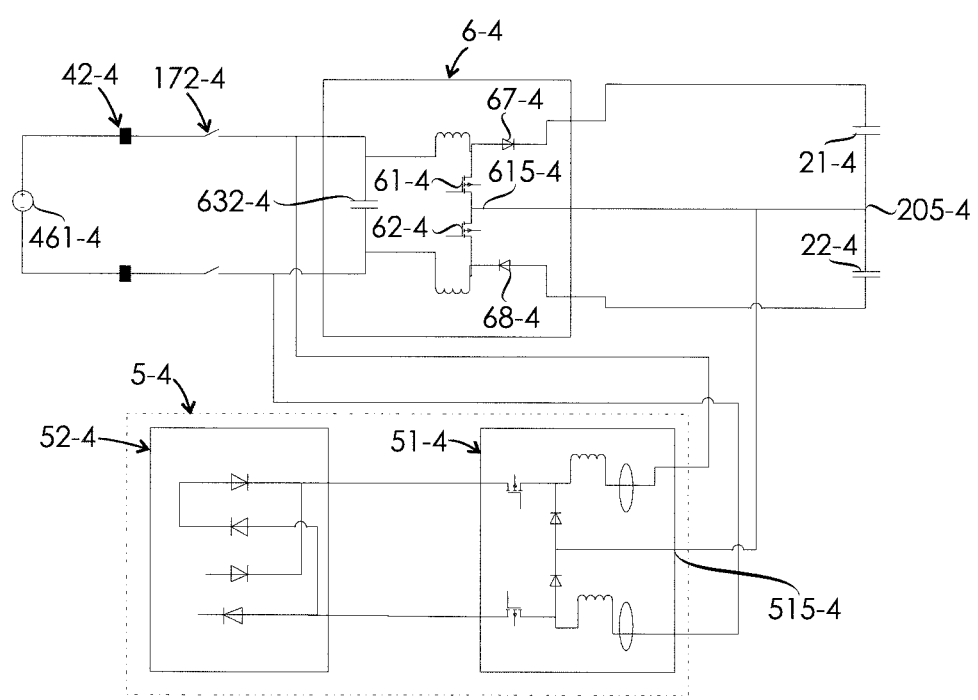
FIG. 4 shows a portion of a simplified circuit diagram of a converter assembly according to an alternative embodiment of the invention.

FIG. 4 shows a portion of a simplified circuit diagram of a converter assembly according to an alternative embodiment of the invention. The converter assembly of FIG. 4 is a modification of the converter assembly of FIG. 1. In the converter assembly of FIG. 4, load side of the pre-charge direct-current converter 51-4 is connected electrically to source side of the secondary source converter 6-4.

The secondary source converter 6-4 comprises filter capacitance 632-4, two controllable semiconductor switches 61-4 and 62-4, and two free wheeling diodes 67-4 and 68-4. A secondary source disconnect device 172-4 of the converter assembly is adapted to disconnect a secondary source connection 42-4 from source side of the secondary source converter 6-4. The load side of the pre-charge direct-current converter 51-4 is connected electrically to a point between the secondary source disconnect device 172-4 and the source side of the secondary source converter 6-4.

The pre-charge converter 5-4 is adapted for pre-charging the filter capacitance 632-4 of the secondary source converter 6-4. Further, the pre-charge converter 5-4 is adapted for pre-charging the DC link capacitance through the free wheeling diodes 67-4 and 68-4 of the secondary source converter 6-4.

During a pre-charging event, the control system keeps the secondary source disconnect device 172-4 open. The control system, as well as several other parts of the converter assembly are omitted from the FIG. 4.

FIG. 4 shows that the any current supply connected to source side of the pre-charge converter 5-4 can be used as an energy source for pre-charging the filter capacitance 632-4 and the DC link capacitance. If a load connection of the converter assembly is connected electrically to source side of the rectification and summing circuit 52-4, it is possible to pre-charge the filter capacitance 632-4 and the DC link capacitance from a load connected to the load connection.

In an embodiment, the source side of the pre-charge converter is connected electrically to at least one alternating current connection and at least one direct current connection of the converter assembly, such that the control system is adapted to selectively supply energy from the at least one alternating current connection and the at least one direct current connection to the pre-charge converter for pre-charging the DC link capacitance. Energy can be supplied for pre-charging the DC link capacitance from any individual alternating current connection or direct current connection alone. It is also possible to supply energy for pre-charging the DC link capacitance from the at least one alternating current connection and the at least one direct current connection at the same time. Further, it is possible to supply energy for pre-charging the DC link capacitance successively from the at least one alternating current connection and the at least one direct current connection.

It will be obvious to a person skilled in the art that the inventive concept can be implemented in various ways. The invention and its embodiments are not limited to the examples described above but may vary within the scope of the claims.

The invention claimed is:

1. A converter assembly comprising:
    a source connection system adapted to be connected electrically to a primary current supply, and at least one secondary source connection adapted to be connected electrically to a secondary current supply, the at least one secondary source connection being a direct current connection;
    a load connection system comprising a load connection adapted to be connected electrically to a load;
    a primary source converter comprising a primary rectifier connected electrically to the primary source connection, and having a boost topology, and a DC link connected electrically between the primary rectifier and the load connection system, the DC link comprising DC link capacitance;
    a secondary source converter, which is a direct-current converter having a boost topology, connected electrically between the at least one secondary source connection and the DC link;
    a control system adapted to control the primary source converter and the secondary source converter; and
    a pre-charge converter adapted for pre-charging the DC link capacitance,
    wherein the pre-charge converter comprises a pre-charge direct-current converter having a step down topology, and the control system is adapted to control the pre-charge converter for pre-charging the DC link capacitance by providing a two-stage pre-charging event such that in the beginning of the pre-charging event the DC link capacitance is charged through the pre-charge converter, and after a voltage of the DC link capacitance has reached a predetermined level, the DC link capacitance is charged through the secondary source converter.

2. The converter assembly according to claim 1, wherein the pre-charge direct-current converter is connected electrically between the at least one secondary source connection and the DC link.

3. The converter assembly according to claim 2, wherein the pre-charge converter comprises a rectification circuit connected electrically between at least one alternating current connection and the pre-charge direct-current converter.

4. The converter assembly according to claim 3, wherein the pre-charge converter comprises a rectification and summing circuit connected electrically to the at least one secondary source connection and the at least one alternating current connection.

5. The converter assembly according to claim 4, wherein the at least one alternating current connection comprises the primary source connection and/or the load connection.

6. The converter assembly according to claim 1, wherein the pre-charge converter comprises a rectification circuit connected electrically between at least one alternating current connection and the pre-charge direct-current converter.

7. The converter assembly according to claim 6, wherein the pre-charge converter comprises a rectification and summing circuit connected electrically to the at least one secondary source connection and the at least one alternating current connection.

8. The converter assembly according to claim 7, wherein the at least one alternating current connection comprises the primary source connection and/or the load connection.

9. The converter assembly according to claim 8, wherein load side of the pre-charge direct-current converter is connected electrically to source side of the secondary source converter.

10. The converter assembly according to claim 1, wherein load side of the pre-charge direct-current converter is connected electrically to source side of the secondary source converter.

11. The converter assembly according to claim 10, wherein the converter assembly comprises a secondary source disconnect device adapted to disconnect the secondary source connection from source side of the secondary source converter, wherein the load side of the pre-charge direct-current converter is connected electrically to a point between the secondary source disconnect device and the source side of the secondary source converter.

12. The converter assembly according to claim 11, wherein the secondary source converter comprises filter capacitance, and the pre-charge converter is adapted for pre-charging the filter capacitance.

13. The converter assembly according to claim 12, wherein the secondary source converter comprises free wheeling diodes such that the pre-charge converter is adapted for pre-charging the DC link capacitance through the free wheeling diodes of the secondary source converter.

14. The converter assembly according to claim 11, wherein the secondary source converter comprises free wheeling diodes such that the pre-charge converter is adapted for pre-charging the DC link capacitance through the free wheeling diodes of the secondary source converter.

15. The converter assembly according to claim 10, wherein the secondary source converter comprises filter capacitance, and the pre-charge converter is adapted for pre-charging the filter capacitance.

16. The converter assembly according to claim 15, wherein the secondary source converter comprises free wheeling diodes such that the pre-charge converter is adapted for pre-charging the DC link capacitance through the free wheeling diodes of the secondary source converter.

17. The converter assembly according to claim 10, wherein the secondary source converter comprises free wheeling diodes such that the pre-charge converter is adapted for pre-charging the DC link capacitance through the free wheeling diodes of the secondary source converter.

18. The converter assembly according to claim 1, wherein the DC link is a split DC link with a mid-point reference, wherein the DC link comprises a first capacitance and a second capacitance connected in series, and the midpoint reference is connected electrically between the first capacitance and the second capacitance, and the secondary source converter has a midpoint connected electrically to the midpoint reference of the DC link, and the control system is adapted to control the secondary source converter for pre-charging the first capacitance and the second capacitance independently from each other.

19. A converter assembly comprising:
a source connection system adapted to be connected electrically to a primary current supply, and at least one secondary source connection adapted to be connected electrically to a secondary current supply, the at least one secondary source connection being a direct current connection;
a load connection system comprising a load connection adapted to be connected electrically to a load;
a primary source converter comprising a primary rectifier connected electrically to the primary source connection, and having a boost topology, and a DC link connected electrically between the primary rectifier and the load connection system, the DC link comprising DC link capacitance;
a secondary source converter, which is a direct-current converter having a boost topology, connected electrically between the at least one secondary source connection and the DC link;
a control system adapted to control the primary source converter and the secondary source converter; and
a pre-charge converter adapted for pre-charging the DC link capacitance, the pre-charge converter comprising a rectification and summing circuit connected electrically to the at least one secondary source connection and to at least one alternating current connection,
wherein the pre-charge converter comprises a pre-charge direct-current converter having a step down topology, and the control system is adapted to control the pre-charge converter for pre-charging the DC link capacitance.

20. A converter assembly comprising:
a source connection system adapted to be connected electrically to a primary current supply, and at least one secondary source connection adapted to be connected electrically to a secondary current supply, the at least one secondary source connection being a direct current connection;
a load connection system comprising a load connection adapted to be connected electrically to a load;
a primary source converter comprising a primary rectifier connected electrically to the primary source connection, and having a boost topology, and a DC link connected electrically between the primary rectifier and the load connection system, the DC link comprising DC link capacitance;

a secondary source converter, which is a direct-current converter having a boost topology, connected electrically between the at least one secondary source connection and the DC link;
a control system adapted to control the primary source converter and the secondary source converter; and
a pre-charge converter adapted for pre-charging the DC link capacitance,
wherein the pre-charge converter comprises a pre-charge direct-current converter having a step down topology and wherein a load side of the pre-charge direct current converter is connected electrically to the source side of the secondary source converter, and the control system is adapted to control the pre-charge converter for pre-charging the DC link capacitance.

* * * * *